J. W. DEARBORN.
MACHINE FOR WRAPPING IRREGULAR ARTICLES.
APPLICATION FILED JUNE 4, 1914.
1,126,719.
Patented Feb. 2, 1915.
8 SHEETS—SHEET 1.
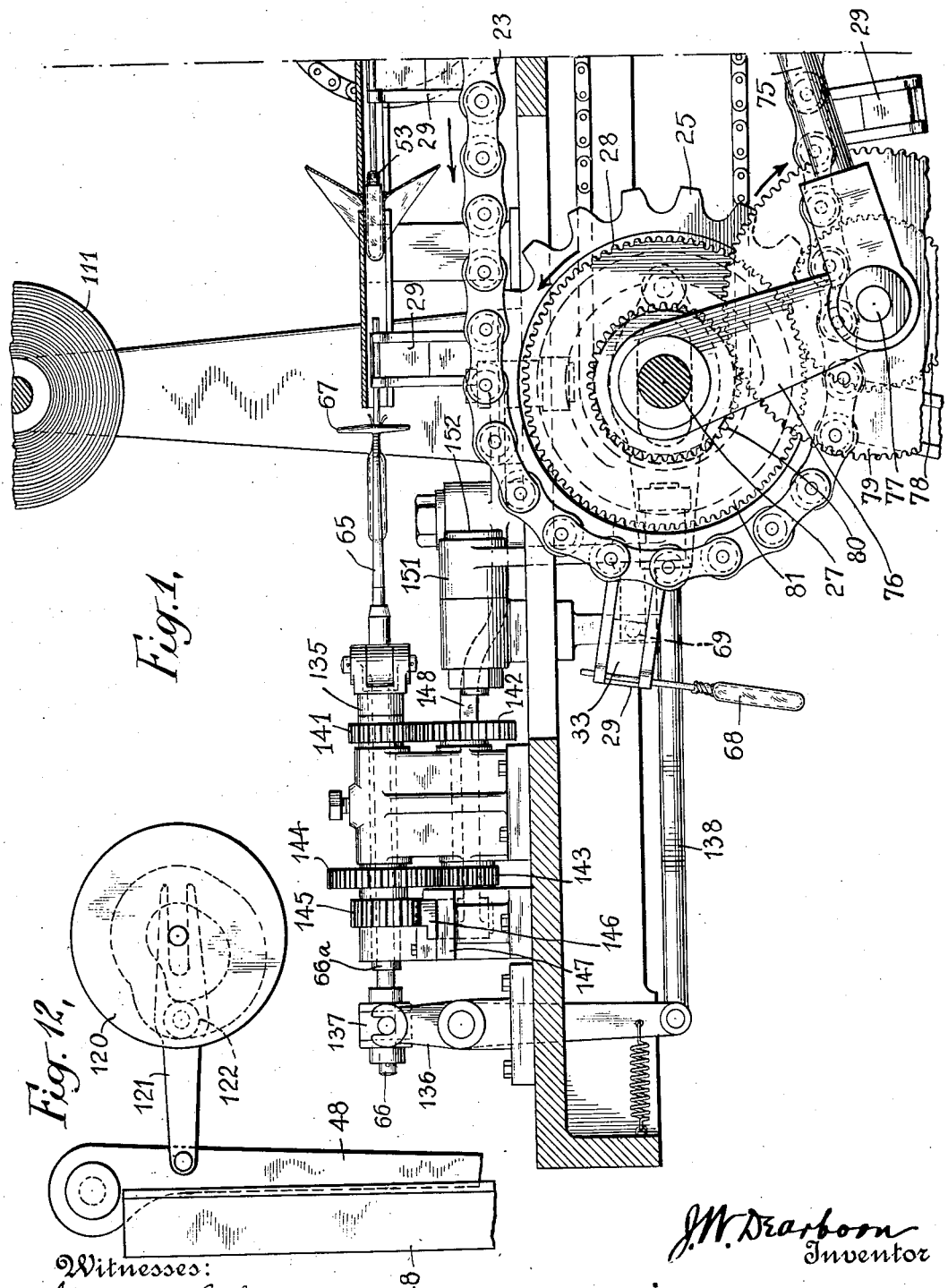

J. W. DEARBORN.
MACHINE FOR WRAPPING IRREGULAR ARTICLES.
APPLICATION FILED JUNE 4, 1914.
1,126,719.
Patented Feb. 2, 1915.
8 SHEETS—SHEET 2.
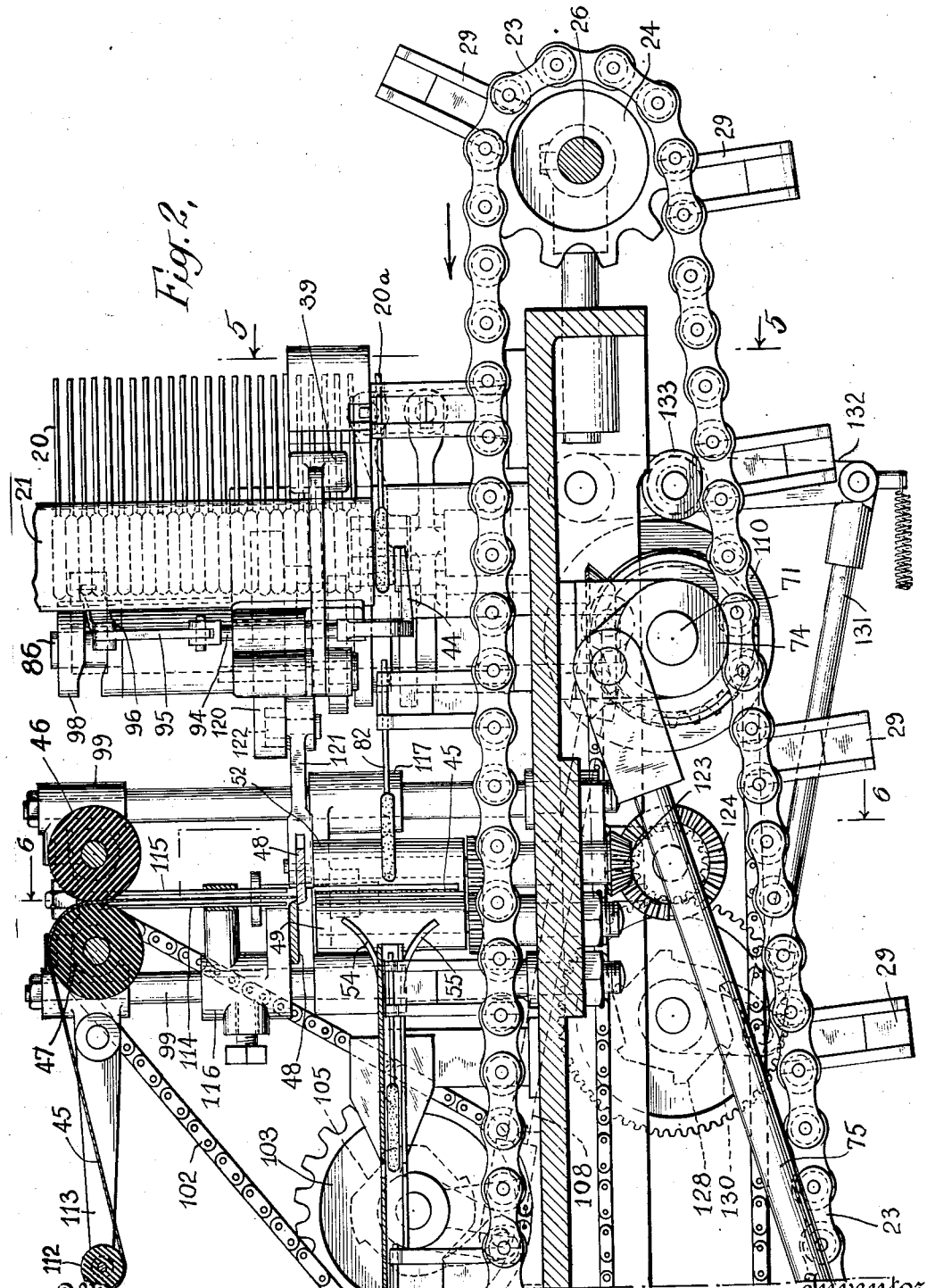

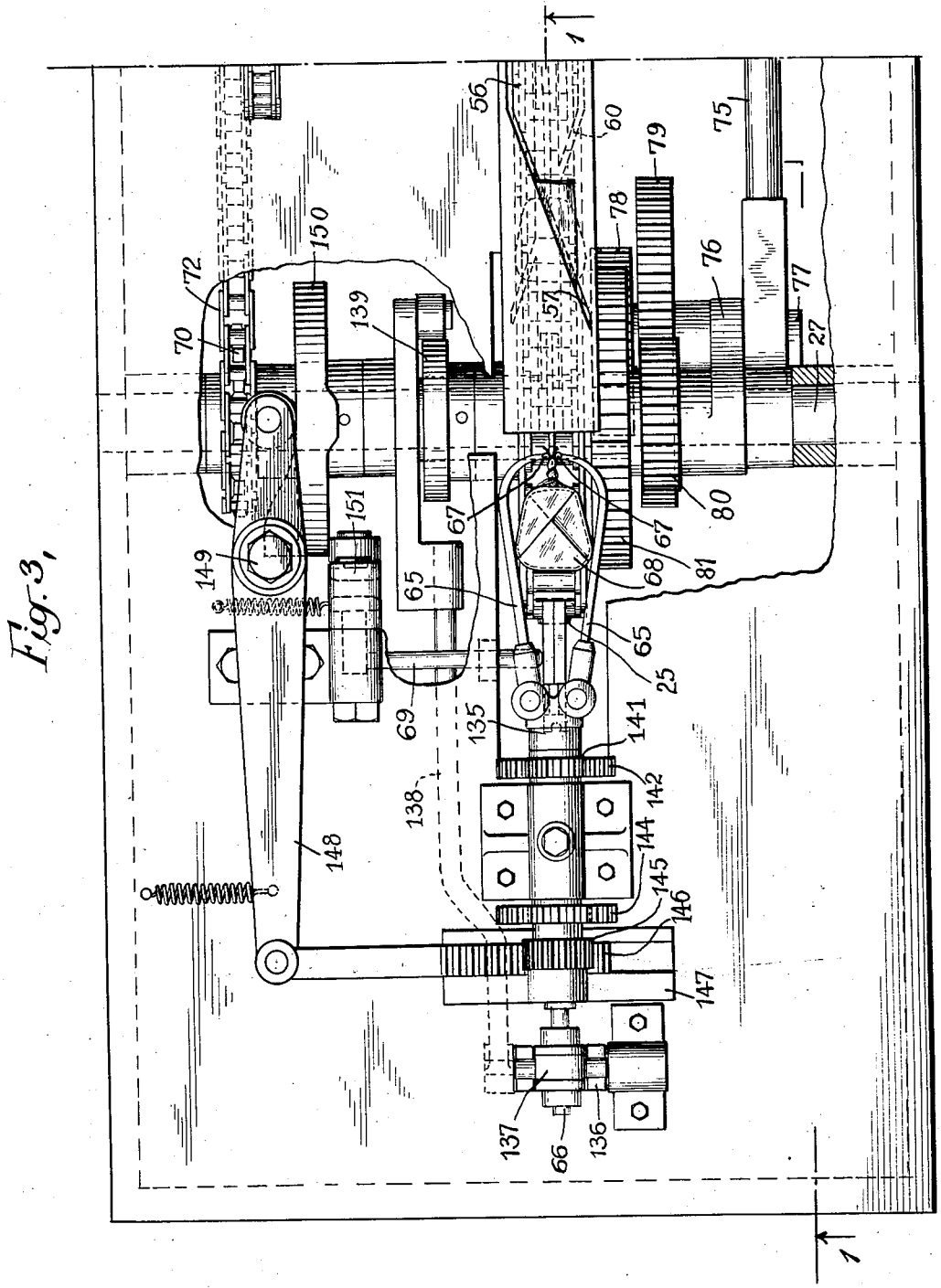

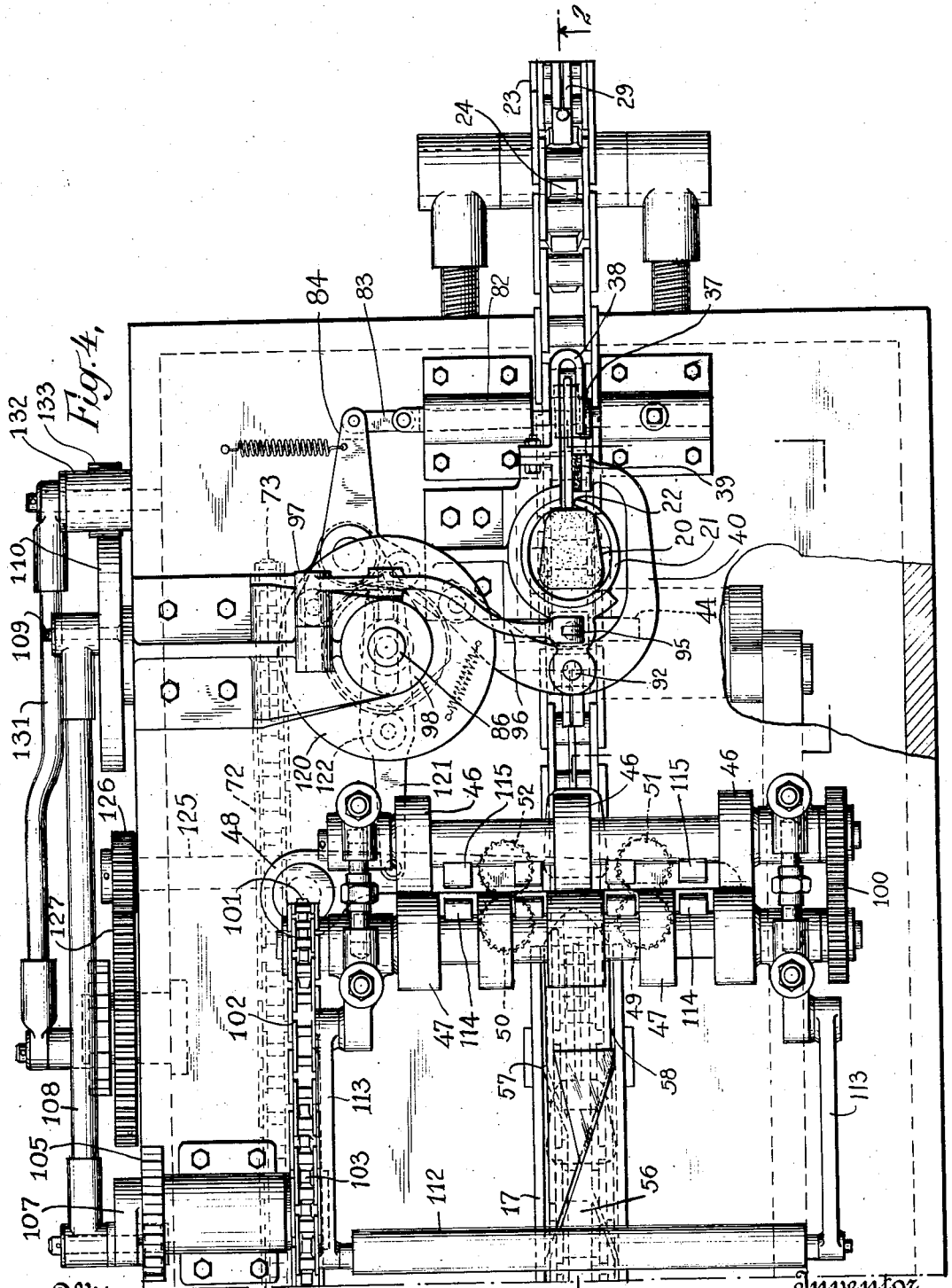

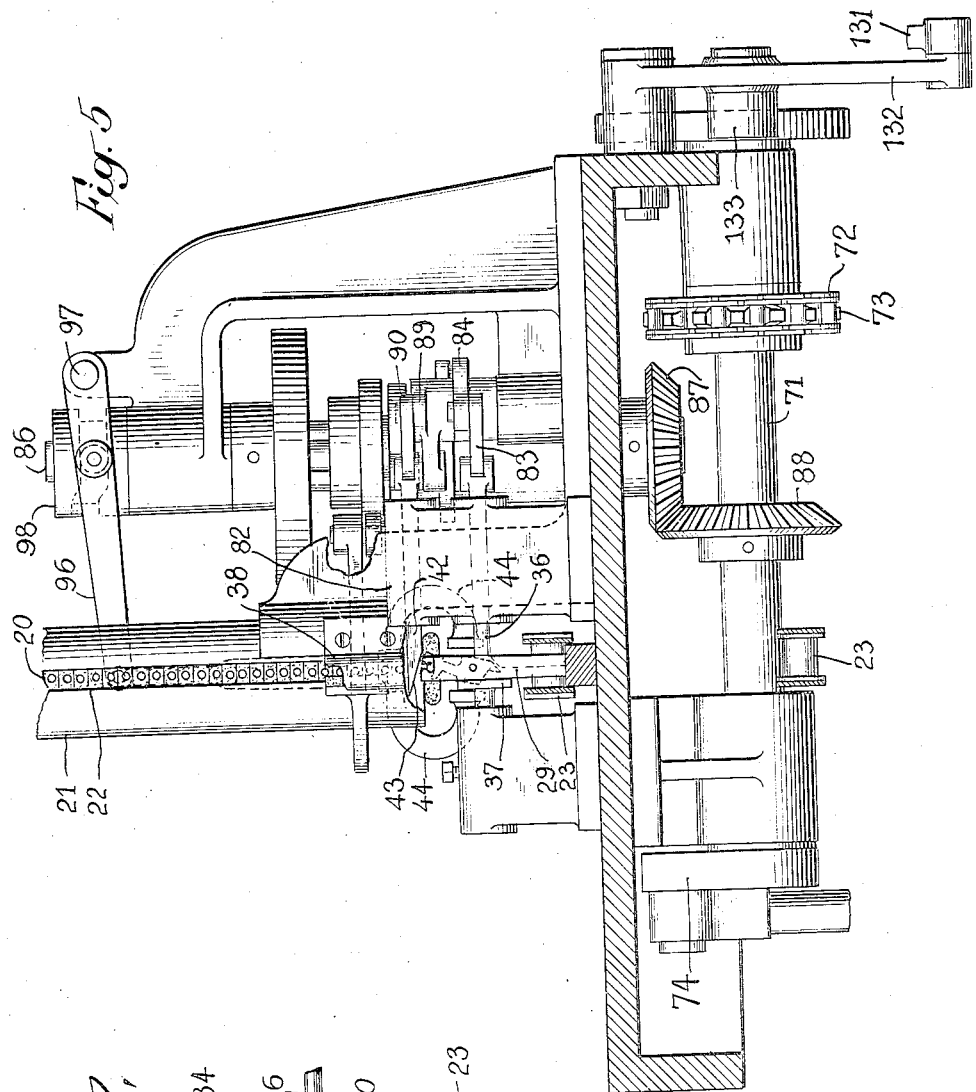
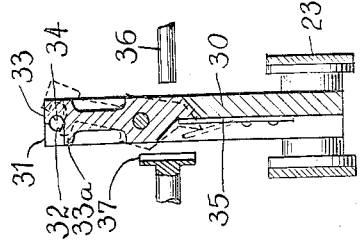
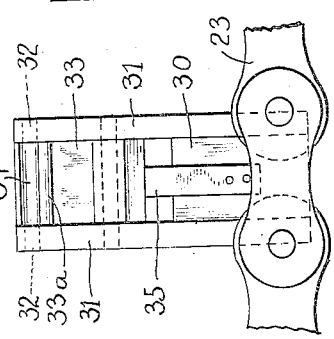

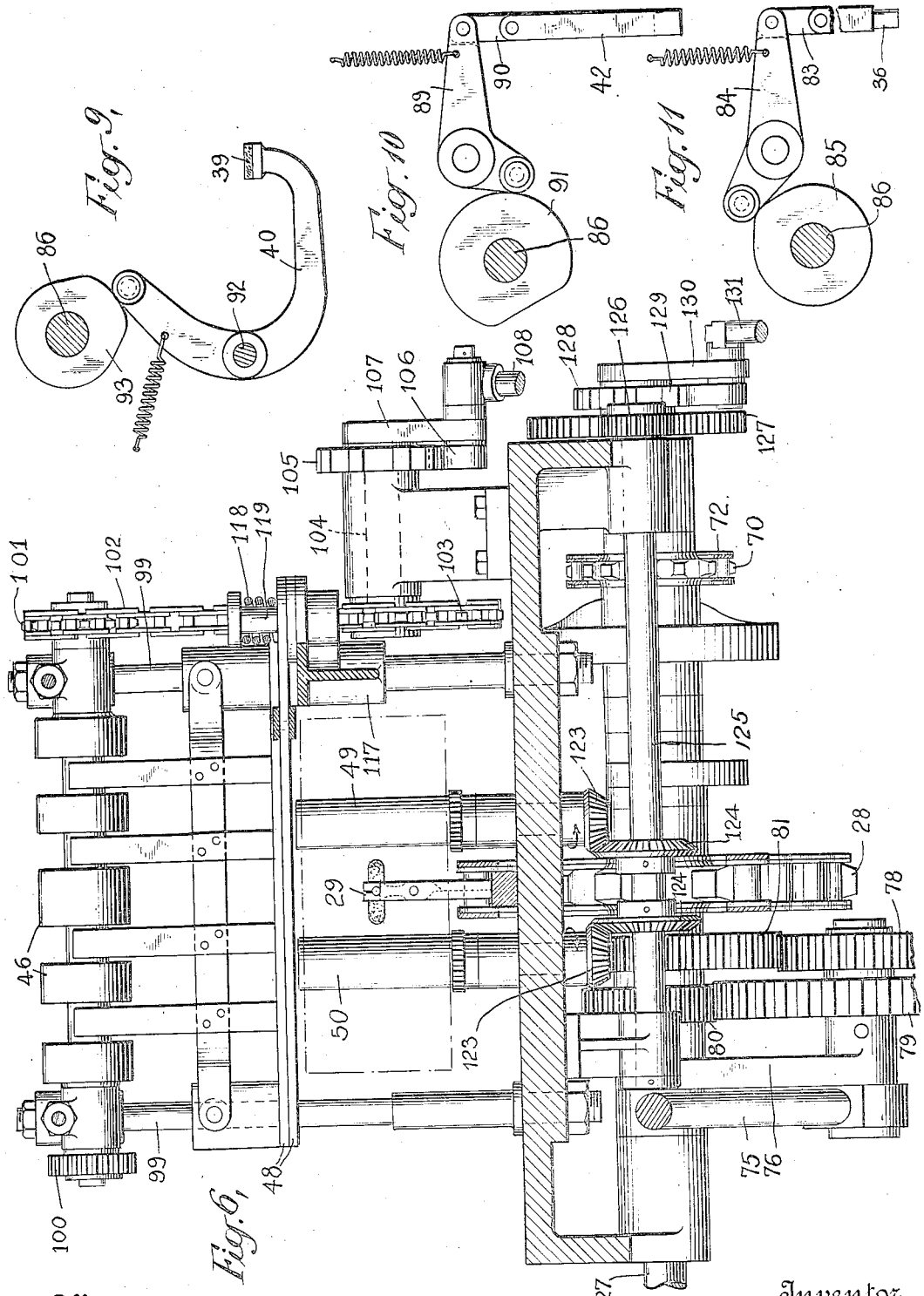

J. W. DEARBORN.
MACHINE FOR WRAPPING IRREGULAR ARTICLES.
APPLICATION FILED JUNE 4, 1914.
1,126,719.
Patented Feb. 2, 1915.
8 SHEETS—SHEET 7.
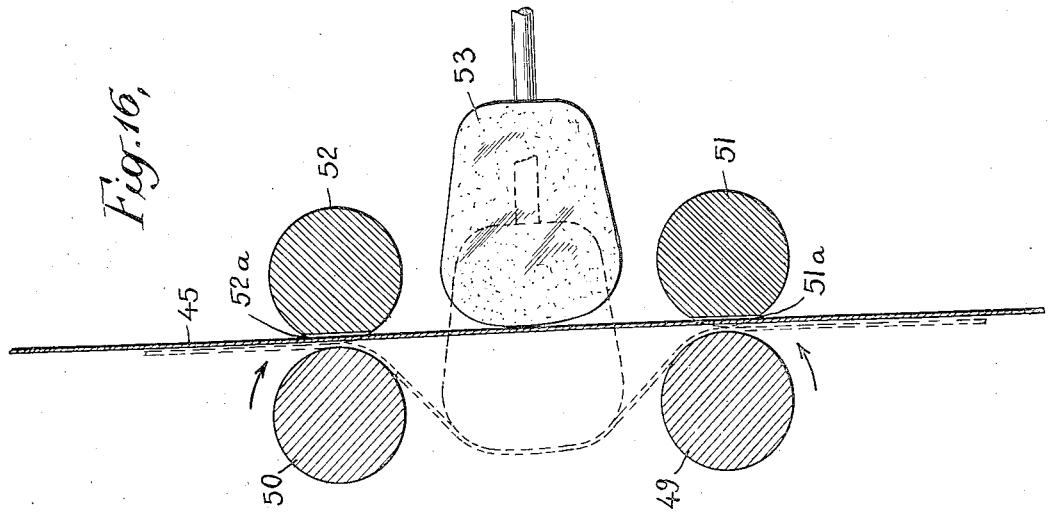
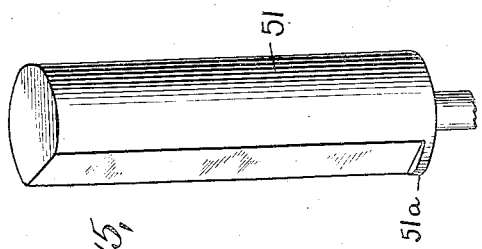
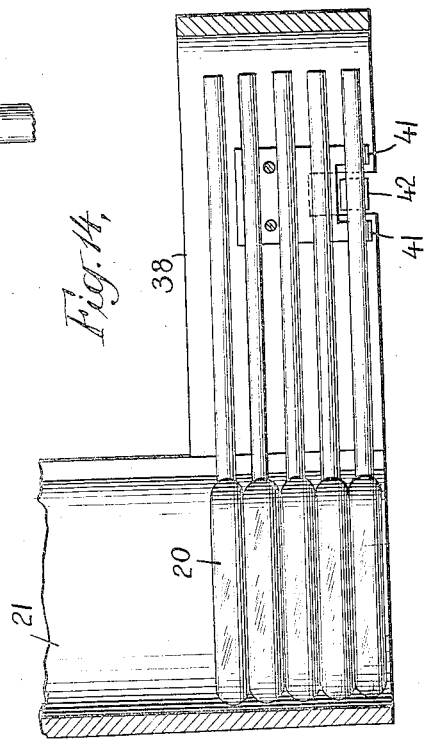
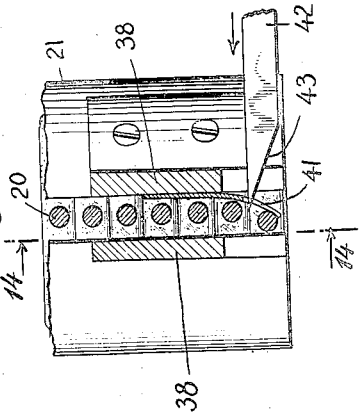
WITNESSES
INVENTOR
BY
his ATTORNEYS J. W. DEARBORN.
MACHINE FOR WRAPPING IRREGULAR ARTICLES.
APPLICATION FILED JUNE 4, 1914.
1,126,719.
Patented Feb. 2, 1915.
8 SHEETS—SHEET 8.
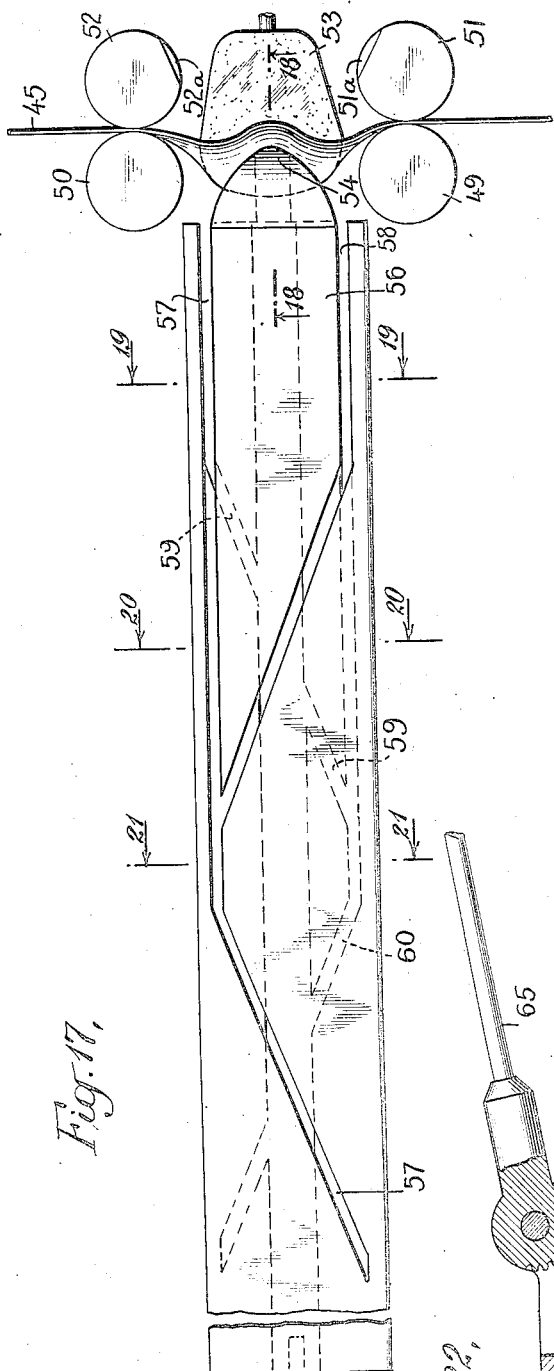
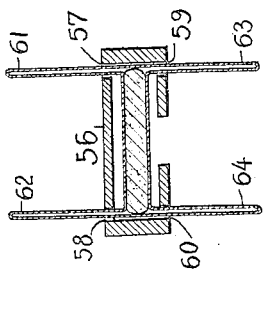
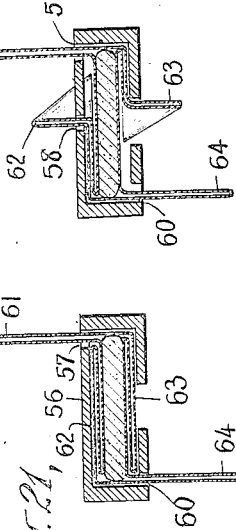
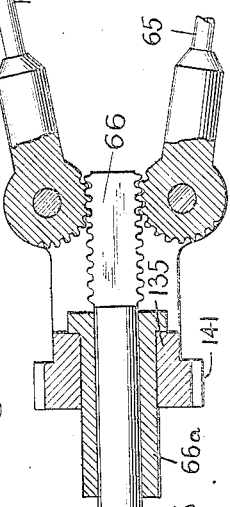
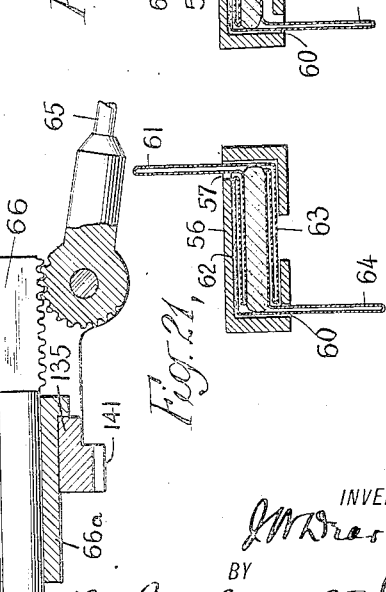
WITNESSES
INVENTOR
ATTORNEYS

UNITED STATES PATENT OFFICE.

JOHN W. DEARBORN, OF SPRINGFIELD, MASSACHUSETTS.

MACHINE FOR WRAPPING IRREGULAR ARTICLES.

1,126,719.   Specification of Letters Patent.   Patented Feb. 2, 1915.

Application filed June 4, 1914. Serial No. 843,014.

*To all whom it may concern:*

Be it known that I, JOHN W. DEARBORN, a citizen of the United States, residing at 169 Main street, Springfield, Massachusetts, have invented certain new and useful Improvements in Machines for Wrapping Irregular Articles, of which the following is a full, clear, and exact description.

Heretofore, so far as I am aware, no machine has been produced which would successfully wrap the articles of confectionery known as "lollypops", the same consisting of a flattened, irregular lump or mass of candy impaled on a thin wooden stick as a handle. Wrapping by machinery an article of regular size or shape, whether cylindrical or angular, ordinarily presents no great difficulty, but to wrap the head of a lollypop or an analogous article is a problem of a different order. The great difficulty hitherto has been found in controlling or handling the paper, (so as to properly cover the head without fail), due to the varying shapes and sizes of the articles, which makes it impossible to apply the paper by the methods successfully used with other articles. For example, in wrapping a rectangular package, the usual method is to arrange the paper over the open side of a suitable open-sided receptacle, and then to push the package into the receptacle (or the receptacle over the package) thereby folding the paper over three sides of the package, after which the projecting edges are folded down upon the package. If this method is attempted with a lollypop the paper does not always fold properly, but often skews to one side or the other with the result that the lollypop comes out of the machine with its head only partially covered, or so imperfectly covered that the wrapping comes off entirely or exposes part of the head in subsequent packing and shipping.

I have accordingly been led to devise my present invention, which has for its chief object to provide a machine in which the wrapping of the lollypop is effected in such manner that each and every article will be perfectly covered and tightly wrapped in the paper, so as to be always adequately protected from dust and other sources of contamination until unwrapped by the consumer.

To this and other ends the invention consists in the novel features of construction and combinations of elements hereinafter described.

One form of the invention is illustrated in the accompanying drawings, in which—

Figures 1 and 2 are sectional side views of the front and rear portions of the machine, respectively, the sections being taken about on the lines 1—1 of Fig. 3 and 2—2 of Fig. 4. Figs. 3 and 4 are plan views of the front and rear portions of the machine, respectively. Fig. 5 is a cross section, about on line 5—5 of Fig. 2. Fig. 6 is a cross section about on line 6—6 of Fig. 2. Fig. 7 is a detail sectional view illustrating the construction and operation of the carriers or grippers which carry the lollypops through the wrapping devices. Fig. 8 is a side view of one of the carriers, looking from the left of Fig. 7. Fig. 9 is a detail view showing the means for holding the stack of lollypops in the chute or hopper while the lowermost is being fed to one of the carriers. Fig. 10 is a detail view showing the plunger which picks out the lowest lollypop from the stack, and the mechanism for actuating the plunger. Fig. 11 is a detail view showing the plunger which opens the carrier-jaws to receive the lollypop, and the means for reciprocating the plunger. Fig. 12 is a detail view of the paper-cutting shears and the actuating mechanism therefor. Fig. 13 is a detail view, partly in section, showing the spring which yieldingly holds the lowermost lollypop-stick in position for engagement by the picking-plunger. Fig. 14 is a detail sectional view on line 14—14 of Fig. 13. Fig. 15 is a detail perspective view of one of the rear paper-guide rollers. Fig. 16 is a detail sectional plan view illustrating the initial position of the paper feed guide rollers and their operations as the lollypop comes against the paper. Fig. 17 is a detail view illustrating the function of the crimpers for crimping or folding the central portions of the paper above and below the lollypop as the latter and the paper advance between the guide-rollers. This figure also shows in detail the flat folding tube and a wrapped lollypop issuing therefrom. Fig. 18 is a detail section on line 18 of Fig. 17. Figs. 19, 20 and 21 are detail sections on lines 19—19, 20—20 and 21—21 of Fig. 17, showing different stages of the folding operation as the lollypop advances through the folding tube. Fig. 22 is a detail view in horizontal section, showing the means for opening and closing the arms which twist the folded wrapper around the lollypop stick.

The lollypops to be wrapped, designated by 20 in Figs. 2, 4 and 5, are placed one above the other in a vertical chute 21 having in its rear a vertical slot 22 through which the handles or sticks project. Below the chute is a chain conveyer 23, traveling longitudinally of the machine (in the direction of the arrows in Figs. 1 and 2) over end sprockets 24, 25, on the transverse shafts 26, 27. The latter is the driving sprocket, and is loose on its shaft but is rigidly connected to the gear 28 (Fig. 1) which is also loose on the shaft. This gear is rotated intermittently and at suitable speed by the means hereafter described.

The chain conveyer 23 is provided at suitable intervals with outstanding handle-grippers 29, which pass successively under the chute 21 and receive the lollypops therefrom in the manner now to be described. Referring to Figs. 5, 7 and 8, it will be seen that each gripper or carrier comprises a body 30, deeply grooved along one side, and notched at the top to provide two upwardly projecting fingers 31 provided at the top with alined grooves 32. Between the fixed fingers 31 is a pivoted finger 33, having a groove 34 at its top and held closed with respect to the other fingers by a blade spring 35 at the bottom. When the gripper or carrier is under the handles of the lollypops 20, Fig. 5, a plunger 36 comes laterally against the tail of the finger 33 on the right-hand side (as viewed in Figs. 5 and 7) and tilts the whole carrier leftwardly, the chain itself twisting counterclockwise. This brings the carrier against a vertically slotted laterally adjustable stop 37; after which, continued leftward movement of the plunger 36 against the finger 33 swings the latter clockwise. The result is that the fingers 31 and the finger 33 are spread apart, or opened, to receive the lollypop stick in the grooves 32, 34. To insure the vertical alinement of the lollypop stick with the open jaws of the gripper or carrier, the chute or hopper 21 is provided with at its bottom with a guide 38 (Figs. 2, 4, and 5) which extends rearwardly and around the ends of the sticks, and part way back to the chute. Between the free end of the guide and the adjacent wall of the chute is a friction pad 39 carried on a swinging arm 40 which presses a few of the sticks above the lowest snugly against the opposite side of the guide and holds the entire stack from dropping while the lowest is being removed, downwardly, from the chute. Normally the arm 40 stands in its outer position, and the entire stack of lollypops in the chute is then supported by two arms 44, (Figs. 2 and 5) extending downwardly and under the path of the lollypops in the grippers 29, then rearwardly under the stack.

The carrier jaws 31, 33 having been opened as described, the clamp or holder 39 swung in, the lowest lollypop is still supported in the chute 21 by the arm 44 and by a depending spring 41, Figs. 13 and 14, fixed at its top to the guide 38 and at its lower end formed with two fingers, as shown in Fig. 14, curved under the stick of the lower-most lollypop to support the same, as indicated in Fig. 13. A laterally moving picking-plunger 42, having an inclined end as indicated at 43, Fig. 13, now comes in, through an opening in the bottom of the guide 38, and between the spring-fingers 41, and cams the lowermost lollypop-stick down past the spring-fingers, just as the arms 44 are lowered. The lollypop is thus carried down till its stick strikes the lip 33ᵃ (Fig. 7) on the jaw 33. During this operation the lollypops above the lowest are held up by the arm 40. The plungers 36 and 42 are now retracted, the withdrawal of the plunger 36 permitting the gripper to swing back from its tilted position to the upright position and the jaw 33 to close, thereby gripping the stick firmly in the grooves 32, 34, with the head of the lollypop held out in front of the gripper, as clearly shown at 20ᵃ in Fig. 2. The chain 23 now starts, carrying the lollypop forward, and after the lollypop has passed the arms 44 the latter are raised to initial position and the presser arm 39 is swung out, thereby releasing the sticks of the lower lollypops and permitting the entire stack to drop down upon the arms 44. This completes one cycle of the lollypop-feeding operation. Beyond, that is to say, in advance of, the lollypop-feeding mechanism, the lollypop carried by the chain conveyer 23 meets the wrapping paper 45, Fig. 2, which extends across the path of the lollypop and is fed into said path from above by means of two rollers 46, 47, through shear-blades 48 by which the paper is cut. Below the shears, in front of the paper and at the sides of the path of the lollypops is a pair of guide-rollers 49, 50, Figs. 2, 4 and 16, geared at their bottoms to another pair of guide-rollers 51, 52, in the rear of the paper.

On one side each of the rear guide rollers is flattened except at the extreme bottom, thereby leaving at the bottom a lip 51ᵃ, 52ᵃ, Figs. 15 and 16. While the paper is fed down between the two pairs of guide-rollers and is cut off by the shears 48 the flat faces of the rear rollers are next to the front rollers, as in Fig. 16, so that when the cut is made the severed sheet drops down upon the aforesaid lips. In the meantime the lollypop, shown at 53 in Figs. 2 and 16, approaches the paper, and the guide rollers (previously stationary) begin to rotate in the direction of the arrows in Fig. 16, at such rate that just about as the advancing lollypop strikes the paper the outer edges of the flat faces of the rear rollers meet the paper and press the same against the front rollers. The normally open paper-receiving and holding devices are thus closed, so that the paper is now held between and by them; and if they should cease to operate, the paper could not move in any direction. However, the rollers continue to turn, and at a peripheral speed at least equal to the linear velocity of the advancing lollypop, so that the paper bulges forward beyond its initial position in the manner indicated by the heavy dotted line in Fig. 16, and is folded back along the sides of the lollypop. As the paper bulges out between the front rollers it (and the lollypop behind it) pass into a pair of upward and downwardly curved folders 54, 55, pointed rearwardly, as shown in Figs. 2, 17 and 18, which crimp down toward the lollypop the central portion of the paper above the same and crimp upwardly the corresponding portion of the paper below the lollypop. It may be stated here that the lower folder or crimper, 55, is slotted longitudinally to permit the carriers or grippers 29 to pass.

Extending forwardly from between the crimpers 54, 55, is a flattened tube 56 having its bottom slotted lengthwise and centrally to afford a path for the lollypop-carrier. Both top and bottom are provided with longitudinal slots 57, 58, 59, 60 to receive the folds 61, 62, 63, 64 formed by the crimpers, as shown in the cross section, Fig. 19. Farther on in the tube the slot 58 slants across the tube, so that as the fold 62 passes through this inclined portion it is folded down upon the lollypop, as indicated in Fig. 20,—disappearing inside the tube where the slot 58 joins the slot 57, as indicated in Fig. 21. Beyond this point the latter slot slants across the tube, thereby laying the fold 61 down upon the fold 62, the former fold disappearing within the tube where the slot 57 ends. Meanwhile, the lower folds 63, 64, have been laid in the opposite direction on the underside of the lollypop (as shown in Figs. 19, 20, 21), by the inclined portions of the slots 59, 60, which are the reverse of those in the top. Finally, in the extreme forward portion of the tube the wrapping is entirely inside the tube, and the lollypop emerges as in Fig. 17. It now remains to twist the rearwardly extending end of the wrapper tightly around the stick. This is effected as follows: In front of the folding tube 56 is a pair of rearwardly extending arms 65, Fig. 8, pivoted at their forward ends on the rear end of a longitudinally extending sleeve 66ᵃ. When the wrapped lollypop emerges, the twisting arms, already open to receive it, close behind the head and at the same time the arms begin to revolve, clockwise as seen from the left of Fig. 1. At their rear ends the twisting arms are equipped with upwardly and downwardly extending fingers 67, so that the rapid revolution about the stick will unfailingly twist the wrapping (see Fig. 3) tightly upon the stick, the lollypop advancing as the twisting process. It will be observed that the twisting arms rotate in the direction in which the folds 61 and 64 extend across the lollypop. This is an important feature, as it prevents unfolding of the wrapper during the twisting operation.

By the time the twisting of the wrapper, described in the preceding paragraph, is completed the carrier 29 in which the lollypop is gripped approaches the point where the chain 23 reaches the sprocket 25 (Fig. 1), whereupon the twisting arms open, releasing the lollypop and allowing it to swing down to the position shown at 68, Fig. 1 where a lateral plunger 69 moves in against the tail of jaw 33 of the carrier (29) and opens the jaw to receive the lollypop. The latter now drops out of the carrier into a suitable receptacle (not shown), the plunger is retracted, and the empty carrier, now closed again by the spring 35, Fig. 7, passes on and goes back to the chute 21 for another lollypop. This completes the wrapping cycle.

The devices by which the above described parts are actuated will now be explained.

The transverse shaft 27, Fig. 1, is the main driving shaft, and is provided at one end with a driving pulley, not shown. Fixed on the shaft is a sprocket 70 (Fig. 3) which drives a transverse shaft 71 at the rear of the machine (Figs. 2, 4 and 5) by means of a chain 72 and a sprocket 73, the latter fixed on the said shaft 71. On the opposite end of the latter shaft is a short crank 74 (Fig. 2), connected by a link 75 to a long arm 76 (Figs. 1 and 3) loose on the main driving shaft 27. In the end of the arm 76 is a wrist-pin 77 on which two gears 78, 79, fixed together, are loosely mounted. The larger gear, 79, meshes with a small gear 80 fast on the shaft 27, while the smaller gear, 78, meshes with a large gear 81 loose on the shaft 27; the reduction ratio from the shaft 27 to the gear 81 being 4:1. At the same time, the crank 74, driven by the shaft 71, revolves at the same speed as the shaft 27, and is of such length that the reciprocation of the link 75 simply rocks the arm 76, rolling the gears 78, 79 on the gears 80, 81. When the link is in its rear-most position the gear 81 is driven one-fourth as fast as the shaft 27. As the crank 74 rotates (counterclockwise as seen in Fig. 2) from the position just referred to, the gears 78, 79, are carried forward under the gears 80, 81, with the result that the speed of the last named gears decreases and finally becomes zero when the axis of the link is about tangent to the path of the center of its pivotal connection with the crank 74 since at that point the link is moving forward with its maximum speed. For a slight distance before and after the point of tangency is reached the velocity of the link differs but very little from the maximum, and hence within such range the gear 81 is moving at a rate so slow as to be practically stationary. The sprocket 25, which it will be remembered, drives the chain conveyer 28, is loose on the shaft 27 but fast to the gear 81; and it will therefore be seen that for a portion of the time the sprocket is practically stationary, and with it the chain 23. During this time the carrier under the chute 21 is loaded in the manner described above. As the link 75 continues to move forward, its speed and that of the arm 76 diminish rapidly, till at the point where the link is at its foremost position the gear 81 is again rotating at one-fourth the speed of the driving shaft 27. Passing this point the gears 78, 79 move rearwardly under the gears 80, 81, and the speed of gear 81 increases. At about the lower point of tangency of the axis of the link to the path of the center of its pivotal connection with the crank 74 the link is moving rearwardly at its maximum velocity and hence the speed of gear 81 is at the maximum, which is about one-half that of the shaft 27. Beyond the lower point of tangency the speed of the gear 81 decreases, and becomes one-fourth that of the shaft 27 when the link 75 reaches its rear-most position, as previously stated. In the period of increasing and decreasing speed from one period of rest to the next, the lollypops reaches the position shown at 82 in Fig. 2. Starting again with increasing speed it engages the paper 45 and pushes it into the crimpers 54, 55 and folding tube 56 before coming to rest again. Finally it emerges from the folding tube and is engaged by the wrapper-twisting arms 65 slightly before its speed decreases to zero. The twisting being completed and the twisting arms opened, the lollypop moves on to the next point of rest, or station, where it is released from the carrier as already described.

The laterally movable plunger 36, Figs. 4, 5 and 7, which opens the jaws of the carriers 29 to receive the lollypops, is slidably mounted in a guide 82 and at its outer end is connected by a link 83 to a bell-crank lever 84 (see also Fig. 11) rocked by a cam 85 on a vertical shaft 86 adjacent to the chute 21 and having on its lower end a bevel gear 87 in mesh with a bevel gear 88 on the constantly driven shaft 71. The cam 85 has a short rise, as shown in Fig. 11, so that the carrier jaws will be open only momentarily.

The feeding plunger 42 (Figs. 5, 10 and 13), which picks the lowermost lollypop out of the supply chute 21, is reciprocated by a bell-crank lever 89 connected thereto by a link 90 and rocked by a cam 91 on the aforesaid vertical shaft 86. This cam has a rather longer rise than the cam 85, so as to remain in its innermost position (shown in Fig. 5) till after the carrier jaws have closed.

The clamping arm 40, Figs. 4, 5, and 9, which carries the yielding pad 39 to hold the lollypops while the lowest is being delivered to the carrier, is fulcrumed at 92 in front of the chute 21 and extends thence to its actuating cam 93 on the vertical shaft 86.

The supporting arms 44, Figs. 2, 4 and 5, which lower the lollypops into the carrier jaws and normally hold the stack of lollypops in proper position in the chute 21, are raised and lowered by a vertical plunger 94 slidably mounted in front of the chute and connected by a link 95 to an actuating lever 96 fulcrumed at 97 and swung vertically by a barrel cam 98 on the vertical shaft 86.

The paper-feeding rollers or disks 46 (Figs. 2, 4 and 6) are journaled in standards 99 at the sides of the machine and are geared together at one end, as shown at 100. At the other end one of the rollers has a driving sprocket 101, connected by a chain 102 to a sprocket 103 on the inner end of a short transverse shaft 104 which at its outer end has a ratchet 105 actuated intermittently by a pawl 106 carried by an arm 107 loose on the shaft. The arm is connected by a link 108 to a crank-pin 109 on the side of a disk 110 (which also serves as a cam, for a purpose described later) on the shaft 71. The revolution of the crank pin, which has a short radius relative to the length of the arm 107, oscillates the latter and so drives the paper-feed rollers intermittently. The paper is drawn by the rollers from a roll 111, Fig. 1, and passes from the roll under a tension idler 112, journaled in the ends of a pair of pivoted arms 113, Figs. 2 and 4. Below the feed rollers the paper passes through front and rear guide stops 114, 115 supported by a carrier 116 on one of the standards 99.

The vertical-guide rollers, 49, 50, 51, 52, Figs. 2, 4, 15 and 16, which release the paper as the lollypop presses against it, are geared together at the bottom as indicated in Fig. 2, and the journals of the rollers 51, 52 are provided with bevel driving pinions 123, (Fig. 6), meshing with bevel gears 124 on a transverse shaft 125. At one end this shaft has a pinion 126 driven intermittently by a gear 127 rigidly fastened to a ratchet 128 which is rotated step by step by a pawl 129 carried on a swinging arm 130 coaxial with the gear 127. A link 131 connects the arm to the lower end of a depending lever 132 (Figs. 2, 4 and 5) fulcrumed by its upper end and having a roller 133 bearing on the cam 110, previously mentioned. The link 121, reciprocated by the cam, thus imparts an intermittent rotary motion to the guide-rollers 49, 50, 51 and 52.

The opening and closing of the twisting arms is effected by the plunger 66, Figs. 1, 3 and 22. The forward ends of the arms are provided with gear-teeth, as shown in Fig. 22, meshing with rack-teeth on the plunger, so that as the plunger reciprocates the arms will open and close, each at the same rate as the other. The plunger is reciprocated by a formed lever 136 coöperating with a collar 137 loose but axially stationary on the plunger, the lever being rocked by a link 138 extending rearwardly to and actuating cam 139 on the shaft 27. The plunger is thus reciprocated at intervals, to open and close the twisting arms.

To rotate the twisting arms 65 the following devices are provided, shown in Figs. 1 and 3: Fixed to the collar 135, on which the arms are pivoted and which is rotatable on the sleeve 66ª, is a small gear 141 meshing with a larger gear 142 fixed to one end of a shaft having at its other end a small gear 143 meshing with a larger gear 144 coaxial with and fixed to a smaller gear 145, both loose on the sleeve 66ª. The gear 145 meshes with a reciprocatory rack 146 slidably mounted in a supporting block 147 below the pinion. It will therefore be seen that when the rack moves in, the gear 145 will be rotated but that the twisting arms will be rotated on the sleeve 66ª at a higher speed by the intermediate gearing. The rack is reciprocated by a lever 148, Fig. 3, fulcrumed at 149 and actuated by one face of a double cam 150 fixed on the main shaft 27.

The plunger 69, Figs. 1 and 3, which opens the carriers 29 to release the wrapped lollypops, is connected to the lower end of an arm 151 pivoted by its upper end at 152 and having a roller-stud 153 bearing on the adjacent face of the double cam 150, so that as the cam revolves the plunger will be reciprocated whenever a carrier 29 arrives in front of it.

It is to be understood that the invention is not limited to the construction herein specifically illustrated, but can be embodied in other forms without departure from its proper spirit and scope. Nor is it limited to wrapping "lollypops," but can be used for wrapping other articles, especially articles of varying or irregular shape.

I claim:

1. In a wrapping machine, the combination with means for advancing the articles to be wrapped, and means for feeding the paper into the path of the articles, of paper-receiving and holding means at the side of said path adapted to feed the paper into said path at a rate proportionate to the advance of the article.

2. In a wrapping machine, in combination, means for advancing the article to be wrapped, means for feeding the paper into the path of the article in position to be engaged by the article advancing therein, mechanism at the sides of the path to hold the paper in position and release the same inwardly as the article advances beyond the plane of the paper, whereby the paper is folded rearwardly upon the sides of the article, and means in advance of the paper-holding means to complete the folding operation.

3. In a wrapping machine, in combination, means to advance the articles to be wrapped, mechanism to feed the paper into the path of the article, devices at the sides of said path to receive the paper and prevent displacement thereof, and operable to feed the paper inwardly toward the center of the path as the article advances beyond the plane of the paper, whereby the paper is bent rearwardly upon the sides of the article, means in advance of said devices to bend the paper rearwardly upon the top and bottom of the article, and means to lay over upon the article the folds formed by the bending operations.

4. In a wrapping machine providing a path for the articles to be wrapped, the combination of mechanism operating intermittently to place a sheet of paper across the path of the advancing articles, movable paper-holding and guiding devices at the sides of said path to receive the paper, intermittently operating means to actuate said devices to cause the same to release and guide the paper inwardly toward the center of the path as the article advances beyond the plane of the paper, whereby the paper is folded on the sides of the article evenly toward the rear, and means beyond the said paper-holding and guiding devices to complete the folding operation.

5. In a wrapping machine providing a path for the articles to be wrapped, in combination, intermittently operating means for placing a sheet of paper across the path of the articles, normally open paper-receiving devices arranged on opposite sides of the path of the article and adapted to close upon the paper to hold the same in said path, intermittently operating mechanism causing said devices to close upon the paper and thereafter feed the paper progressively inward as the article advances between said devices, whereby to lay the paper rearwardly upon the sides of the article, and means beyond said devices to complete the folding of the paper upon the article.

6. In a wrapping machine providing a path for the articles to be wrapped, in combination, intermittently operating means for placing across the path of the articles the paper in which they are to be wrapped; front paper-holding devices in front of the path of the paper and at each side of the path of the packages, and rear paper-holding devices behind the path of the paper, the said devices and rollers being adapted to receive and hold the paper between them; and means for rotating the rollers to feed the paper progressively inward toward the center of the path of the articles, whereby to fold the paper rearwardly upon the article as the latter emerges from between the rollers.

7. In a wrapping machine providing a path for the articles to be wrapped and a path through which the wrapping-paper is placed transversely in the path of the articles, in combination, a pair of paper-holding and guiding devices in front of the paper path, one on each side of the path of the article; a pair of paper-holding and guiding rollers in rear of the paper path, one on each side of the path of the articles to coöperate with the adjacent device in front of it and each having a flat side whereby the paper can pass freely into the spaces so formed between the rollers and the said devices; and means for rotating the rollers to carry their flattened sides inwardly toward the path of the articles.

8. In a wrapping machine providing a path for the articles to be wrapped, in combination, a pair of rollers, one on each side of the path of the articles; a pair of rollers in rear of the first pair, one on each side of the path of the articles to coöperate with the adjacent roller of the first pair and each having a flattened side to provide a receiving space for the paper in which an article is to be wrapped; and means to rotate each roller inwardly toward the coöperating roller and toward the path of the articles.

9. In a wrapping machine providing a path for the articles to be wrapped, in combination, a front roller on each side of the path of the articles; a roller on each side of the said path and in rear of the adjacent front roller to coöperate therewith, and having a flattened side to provide a space to receive the paper in which an article is to be wrapped; intermeshing gears on the ends of the rollers at each side of the path of the articles whereby the coöperating rollers rotate in opposite directions; and means for rotating the rollers in the directions necessary to carry the flattened sides of the rear rollers inwardly toward the path of the articles.

10. In a wrapping machine providing a path for the articles to be wrapped, in combination, a pair of coöperating paper-holding and feeding rollers on each side of the path of the articles, at least one roller of each pair having a flattened side to provide a paper-receiving space; means to rotate the rollers of each pair inwardly toward each other and toward the path of the articles; and means for feeding the paper between the rollers of each pair while the said flattened sides are in receiving position.

11. In a wrapping machine, in combination, means for advancing the articles to be wrapped; movable paper-receiving and holding means at the sides of the path of the articles; mechanism for placing paper across the path of the articles and in said receiving and holding means; and mechanism for moving the receiving and holding means to feed other portions of the paper inwardly toward the path of the articles.

12. In a wrapping machine providing a path for the articles to be wrapped, the combination with means for placing the wrapping-paper across the path of the articles, of movable means to hold the paper across said path, and mechanism for moving said means to carry the outer portions of the paper inwardly toward said path.

13. In a wrapping machine providing a path for the articles to be wrapped, the combination of movable devices to hold the wrapping paper across the path of the articles, and means for moving the said devices to carry inwardly toward the path of the articles the outer portion of the paper held by said devices.

14. In a wrapping machine, the combination of movable devices spaced apart laterally and adapted to hold the end portions of a sheet of paper, means for moving an article to be wrapped through the space between said devices, and means for moving the said devices to pass the end portions of the paper inwardly toward the article as the latter advances and at substantially the same rate of speed.

15. In a wrapping machine, the combination of rotatable devices spaced apart laterally and adapted to hold the end portions of a sheet of paper, means to feed the paper to said devices with the central portion of the paper in the space between the devices, means for carrying an article to be wrapped through the space between said devices, and means for moving said devices to pass the end portions of the paper laterally inward toward the article as the latter advances through said space.

16. In a wrapping machine providing a path for the articles to be wrapped, in combination, a pair of vertical paper-receiving and holding rollers on each side of the path of the articles, means for rotating the rollers inwardly and toward the said path as an article advances between the pairs of rollers whereby the outer portions of the paper held by the rollers are fed inwardly toward said path and are folded rearwardly upon the sides of the article, means above and below the path of the article to lay upon the article the central portions of the paper and thereby produce side-folds extending upwardly and downwardly from the article at the sides thereof, means for folding said side folds laterally inward upon the article, and means operating upon the folds thus folded upon the article to fix the same in such position.

17. In a wrapping machine providing a path for the articles to be wrapped, the combination of a front roller and a coöperating rear roller at each side of the path of the articles, to hold across said path the paper in which an article is to be wrapped, means to advance the article between the pairs of rollers, mechanism to rotate the rollers inwardly and toward said path as the article advances to lay the outer portions of the paper rearwardly along the sides of the article, crimpers above and below the path of the article and extending rearwardly between the two front rollers to fold upon the article the central portions of the paper, and thereby produce side-folds extending upwardly and downwardly from the sides of the article, means in advance of the crimpers to fold the side-folds inwardly upon the article, and means operating on the folds so folded upon the article to fix the same in such position.

In testimony whereof I affix my signature in the presence of two subscribing witnesses.

JOHN W. DEARBORN.

Witnesses:
GRACE T. McGLYNN,
ROBERT S. FOLSOM.